United States Patent
Bridgelall et al.

(10) Patent No.: US 6,415,982 B2
(45) Date of Patent: Jul. 9, 2002

(54) TRIGGERED DATA COLLECTOR AND DATA TRANSMITTER

(75) Inventors: Raj Bridgelall, Mount Sinai; Joel Kahn, Rockville Centre, both of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/812,076

(22) Filed: Mar. 19, 2001

Related U.S. Application Data

(60) Continuation-in-part of application No. 09/711,850, filed on Nov. 13, 2000, and a continuation-in-part of application No. 08/820,048, filed on Mar. 18, 1997, now Pat. No. 5,744,791, which is a division of application No. 08/686,157, filed on Jul. 24, 1996, now Pat. No. 5,801,371, which is a division of application No. 08/407,577, filed on Aug. 20, 1995, now Pat. No. 5,600,121.

(51) Int. Cl.$^7$ .............................................. G06K 7/10
(52) U.S. Cl. .................................. 235/472.01; 235/383
(58) Field of Search ............................ 235/472.01, 383

(56) References Cited

U.S. PATENT DOCUMENTS 5,450,491 A * 9/1995 McNair ................. 235/472.01

* cited by examiner

Primary Examiner—Harold I. Pitts
(74) Attorney, Agent, or Firm—Kirschstein, et al.

(57) ABSTRACT

A plurality of data collectors and/or a transceiver for transmitting data in a plurality of transmissions are actuated by independent, manual actuations of a triggering circuit, preferably comprising a plurality of trigger switches, or a single trigger switch having a plurality of trigger positions.

19 Claims, 7 Drawing Sheets

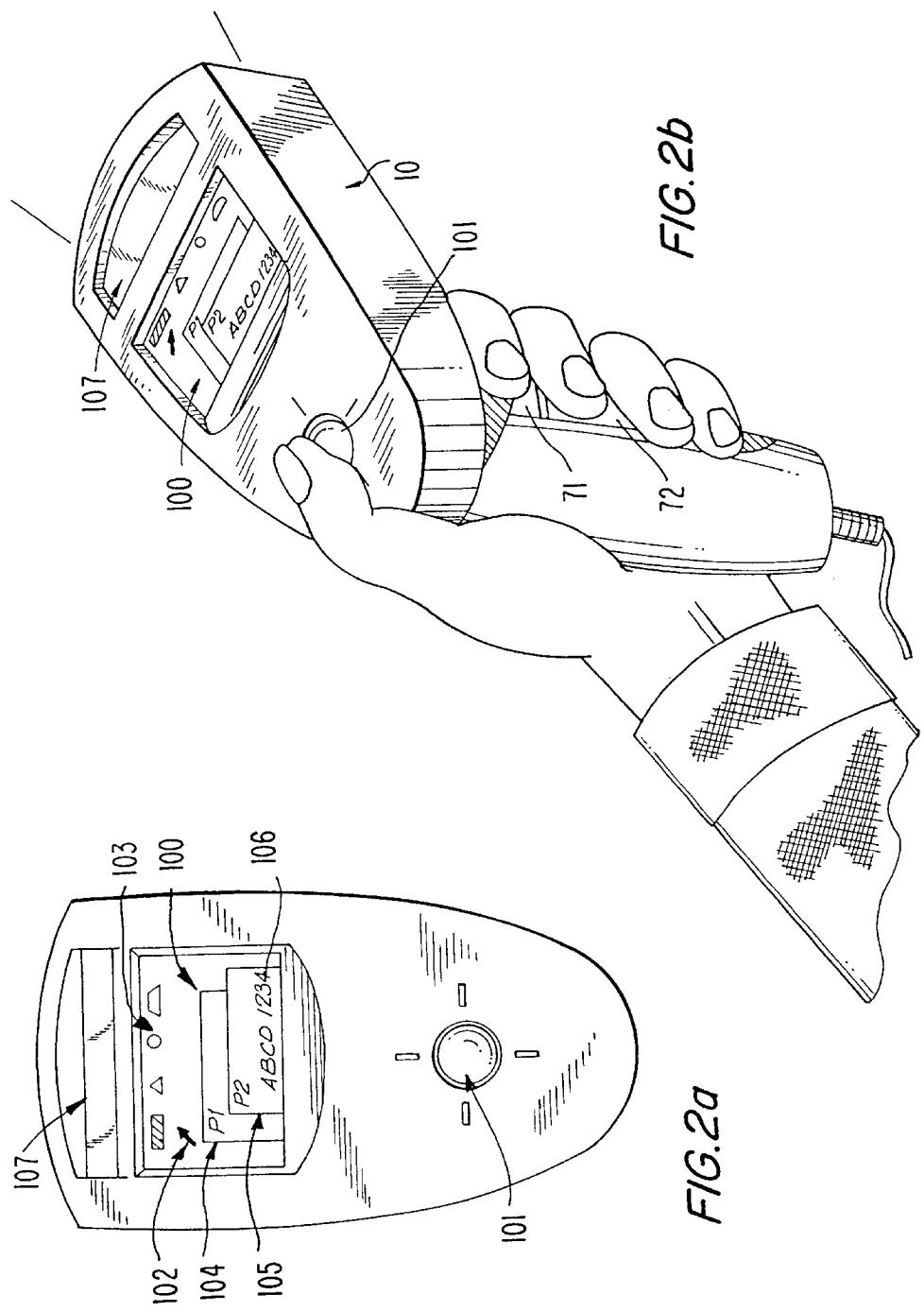

# TRIGGERED DATA COLLECTOR AND DATA TRANSMITTER

REFERENCE TO RELATED APPLICATIONS

This application is a continuation-in-part of U.S. patent application Ser. No. 09/711,850, filed Nov. 13, 2000, and is also a continuation-in-part of U.S. patent application Ser. No. 08/820,048, filed Mar. 18, 1997, now U.S. Pat. No. 5,744,791, which is a division of U.S. patent application Ser. No 08/686,157, filed Jul. 24, 1996, now U.S. Pat. No. 5,801,371, which is a division of U.S. patent application Ser. No. 08/407,577, filed Aug. 20, 1995, now U.S. Pat. No. 5,600,121, and is also related to U.S. patent application Ser. No. 07/897,835, filed Jun. 12, 1992, now abandoned, and U.S. patent application Ser. No. 08/542,517, filed Oct. 13, 1995, now U.S. Pat. No. 5,600,119, which is a continuation of U.S. patent application Ser. No. 08/294,438, filed Aug. 23, 1994, now abandoned, which is a continuation of U.S. patent application Ser. No. 08/037,143, filed Mar. 25, 1993, now abandoned, (which is a division of U.S. patent application Ser. No. 07/715,267, filed Jun. 14, 1991, now U.S. Pat. No. 5,235,167) and abandoned U.S. patent application Ser. No. 08/268,589, U.S. patent application Ser. No. 08/269,170, now U.S. Pat. No. 5,672,858, abandoned U.S. patent application Ser. No. 08/269,171 and U.S. patent application Ser. No. 08/268,913, filed Jun. 30, 1994, now U.S. Pat. No. 5,621,203, respectively, entitled "Multiple Laser Indicia Reader Optically Utilizing A Charge Coupled Device (CCD) Detector And Operating Method Therefor", "Apparatus And Method For Reading Indicia Using Charge Coupled Device And Scanning Lens Bar Technology", "Tunnel Scanner With Multiple Scan Units Having Multiple Light Emitters And Optionally Utilizing A Charge Coupled Detector Or Sensor Array" and "Method And Apparatus For Reading Two-Dimensional Bar Code Symbols With An Elongated Laser Line."

BACKGROUND OF THE INVENTION

This invention generally relates to an arrangement for and a method of collecting data by various modalities, and transmitting the collected data by wireless transmission to a remote host and, more particularly, to independently manually triggering a plurality of the data collecting modalities and/or the data transmitting function.

DESCRIPTION OF THE RELATED ART

Various optical readers and optical scanning systems have been developed heretofore for reading indicia such as bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and utilized as an input to a data processing system for applications in point-of-sale processing, inventory control and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application. As disclosed in some of the above patents, one embodiment of such a scanning system resides, inter alia, in a hand held, portable laser scanning device supported by a user, which is configured to allow the user to aim the scanning head of the device, and more particularly, a light beam, at a targeted symbol to be read.

The light source in a laser scanner bar code reader is typically a gas laser or semiconductor laser. The use of semiconductor devices as the light source is especially desirable because of their small size, low cost and low voltage requirements. The laser beam is optically modified, typically by an optical assembly, to form a beam spot of a certain size at the target distance. It is preferred that the cross section of the beam spot at the target distance be approximately the same as the minimum width between regions of different light reflectivity, i.e., the bars and spaces of the symbol. At least one bar code reader has been proposed with two light sources to produce two light beams of different frequency.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) is referred to as the density of the symbol. To encode the desired sequence of the characters, a collection of element arrangements are concatenated together to form the complete bar code symbol, with each character of the message being represented by its own corresponding group of elements. In some symbologies, a unique "start" and "stop" character is used to indicate when the bar code begins and ends. A number of different bar code symbologies exist, these symbologies include UPC/EAN, Code 39, Code 128, Codeabar, and Interleaved 2 of 5, etc.

In order to increase the amount of data that can be represented or stored on a given amount of surface area, several new bar code symbologies have recently been developed. One of these new code standards, Code 49, introduces a "two dimensional" concept for stacking rows of characters vertically instead of extending the bars horizontally. That is, there are several rows of bar and space patterns, instead of only one row. The structure of Code 49 is described in U.S. Pat. No. 4,794,239, which is herein incorporated by reference. Another two-dimensional symbology, known as "PDF417", is described in U.S. Pat. No. 5,304,786.

Still other symbologies have been developed in which the symbol is comprised of a matrix array made up of hexagonal, square, polygonal and/or other geometric shapes. Such symbols are further described in, for example, U.S. Pat. Nos. 5,276,315 and 4,794,239. Such matrix symbols may include Vericode, Datacode, and MAXICODE (all trademarks of their respective owners).

In the laser beam scanning systems known in the art, the laser light beam is directed by a lens or other optical components along the light path toward a target that includes a bar code symbol on the surface. The moving-beam scanner operates by repetitively scanning the light beam in a line or series of lines across the symbol by means of motion of a scanning component, such as the light source itself or a mirror disposed in the path of the light beam. The scanning component may either sweep the beam spot across the symbol and trace a scan line across the pattern of the symbol, or scan the field of view of the scanner, or do both.

Bar code reading systems also include a sensor or photodetector which detects light reflected or scattered from the symbol. The photo-detector or sensor is positioned in the scanner in an optical path so that it has a field of view which ensures the capture of a portion of the light which is reflected or scattered off the symbol. This light is detected and converted into an electrical signal. Electronic circuitry and software decode the electrical signal into a digital representation of the data represented by the symbol that has been scanned. For example, the analog electrical signal generated by the photo-detector is converted by a digitizer into a pulse or modulated digitized signal, with the widths corresponding to the physical widths of the bars and spaces. Such a digitized signal is then decoded, based on the specific symbology used by the symbol, into a binary representation of the data encoded in the symbol, and subsequently to the alpha-numeric characters so represented.

The decoding process of known bar code reading system usually works in the following way. The decoder receives the pulse width modulated digitized signal from the digitizer, and an algorithm, implemented in the software, attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alpha-numeric characters so represented.

Moving-beam laser scanners are not the only type of optical instrument capable of reading bar code symbols. Another type of bar code reader is one which incorporates detectors based on solid state imaging arrays or charge coupled device (CCD) technology. In such prior art readers the sides of the detector are typically smaller than the symbol to be read because of the image reduction by the objective lens in front of the array or CCD. The entire symbol is flooded with light from a light source such as lighting light emitting diodes (LED) in the scanning device, and each array cell is sequentially read out to determine the presence of a bar or a space.

The working range of CCD bar code scanners is rather limited as compared to laser based scanners and is especially low for CCD based scanners with an LED illumination source. Other features of CCD based bar code scanners are set forth in U.S. patent application Ser. No. 08/041,281 which is hereby incorporated by reference, and in U.S. Pat. No. 5,210,398. These references are illustrative of the earlier technological techniques proposed for use in CCD type scanners to acquire and read indicia in which information is arranged in a two dimensional pattern.

In an attempt to enable the user readily to position the hand-held reader so as to readily read the symbol, a variety of techniques of aiming the laser light at the indicia are known. U.S. Pat. No. 4,835,374 describes an aiming light arrangement to assist the user in visually locating and aiming the head at each symbol, the aiming light being a visible non-laser light source. Although the use of a discrete aiming light arrangement did assist the user in reliably aiming the head at the symbol for some applications, another system, disclosed in U.S. Pat. No. 5,117,098, used a multi-position trigger switch in a hand-held laser scanner. The head was arranged to be aimed at the symbol to be scanned during a first operational state in which an aiming pattern was emitted. Once the user had aligned the head properly with respect to the location of the symbol, the trigger switch was actuated again to put the device into a second operational state in which the beam was scanned across the symbol in the normal scanning or reading mode, and the symbol decoded. The same laser was used both to create the aiming pattern and the scanning beam.

European Patent No. 0355355 describes a combination bar code reader and EAS tag deactivator, including an embodiment with a multi-position trigger.

Another bar code reader with a multi-position trigger switch (for a rather different purpose) is disclosed in the article by Grabowski and Wohl, an IBM Technical Disclosure Bulletin, page 78, Volume 5, No. 5, October 1962.

Yet other aiming and scanning arrangements in which changing from one mode to another is performed in an automatic (i.e., non-manual) manner are described in the series of U.S. Pat. Nos. 4,933,538; 5,229,591; and 5,250,791 assigned to the present assignee.

Radio frequency (RF) tags or targets bear data that can be electronically written and rewritten, and that can interrogated or polled remotely, even through opaque surfaces. The tags have RF resonators such as quartz crystals or dipoles. An RF reader activates an RF source and detects the RF response characteristics of the tag to generate data relating to an object with which the tag is associated.

Magnetic stripes bear data that can be electromagnetically written and rewritten, and that can be read by magnetic stripe readers or sensors. The stripes are provided on cards, such as credit, debit or identification cards, each stripe extending along a longitudinal direction generally parallel to a longitudinal edge of a respective card.

In the automatic identification and data capture (AIDC) industry, certain form factors, i.e., specific space allocations for devices having known functionalities, have become standards. One such form factor for a scan engine module known as the "SE 1200" has been adopted by the AIDC industry and is produced by Symbol Technologies, Inc. of Holtsville, N.Y., the assignee of the instant application. The SE 1200 module is used in hand-held scanners for reading bar code symbols and has a parallelepiped shape measuring 1-½ inches in length, 1 inch in width, and ¾ of an inch in height.

However, because this form factor is standardized and, therefore, the space allocated is limited to a certain, fixed size and shape, the functionality of the SE 1200 module is limited as well since additional circuits and functions cannot readily be added to the existing allocated space and circuitry. Also, the input and output interfaces of this module are fixed, and any new functions or circuits must employ the given interfaces.

OBJECTS OF THE INVENTION

It is an object of this invention to collect data from a plurality of collectors, and to independently activate the collectors.

It is another object of the invention to transmit data by wireless communication to a remote host, and to independently activate the data transmissions.

It is a further object of the present invention to collect and transmit data by independent triggering actions.

SUMMARY OF THE INVENTION

In keeping with these objects, and others which will become apparent hereinafter, one feature of this invention resides, briefly stated, in an arrangement for, and a method of, processing information. In one embodiment, a plurality of data collectors is provided on a support, each data collector being operative for collecting respective data. A triggering circuit, in accordance with the invention, is operative for independently, manually actuating the plurality of data collectors.

In another embodiment, an actuatable transceiver is provided on the support, and is operative for transmitting data by wireless communication to a host remote from the support. In this case, the triggering circuit is operative for independently, manually actuating one of the data collectors and the transceiver.

In still another embodiment, the triggering circuit is operative for independently, manually actuating the transceiver to transmit one of the data during a first actuation of the triggering circuit, and to transmit another of the data during a second actuation of the triggering circuit.

The novel features which are considered as characteristic of the invention are set forth in particular in the appended claims. The invention itself, however, both as to its construction and its method of operation, together with additional objects and advantages thereof, will best be understood from the following description of a preferred embodiment, which is described by way of example only, when read in conjunction with the accompanying drawing.

BRIEF DESCRIPTION OF THE DRAWING

FIG. 2a is an enlarged top plan view of a bar code reader with a trackball (joystick) and a graphical user interface display according to the present invention;

FIG. 2b is a perspective view of the bar code reader of FIG. 2a;

FIG. 2c is an enlarged top plan view of the display of FIG. 2a;

DETAILED DESCRIPTION OF THE PREFERRED EMBODIMENTS

The invention, in one embodiment, takes the form of a portable, hand held optical reader contained within a housing (or body) 10 of appropriate shape. The exact form of the housing 10 is not of importance, and may depend upon the particular application. A conventional gun-shaped housing would be suitable in many cases. The reader may also be arranged for hands-free use and could be fixed instead of being portable.

In one implementation, the invention provides a system for reading coded symbols with a light source for generating a beam directed toward a symbol to be read, a detector for receiving reflected light from the symbol to produce electrical signals corresponding to data represented by the symbol, a first actuator manually displaceable from an off position to a first selectable position for initiating reading of the symbol, and an independently operable second actuator is manually displaceable from a first position to a second position to transfer said data represented by the symbol. As an example, the data may be transferred to a printer, or to a display for visually displaying the data. The data may also be transferred to a radio frequency or IF transmitter for wireless communication of the data to a remote receiver.

Figure 1:
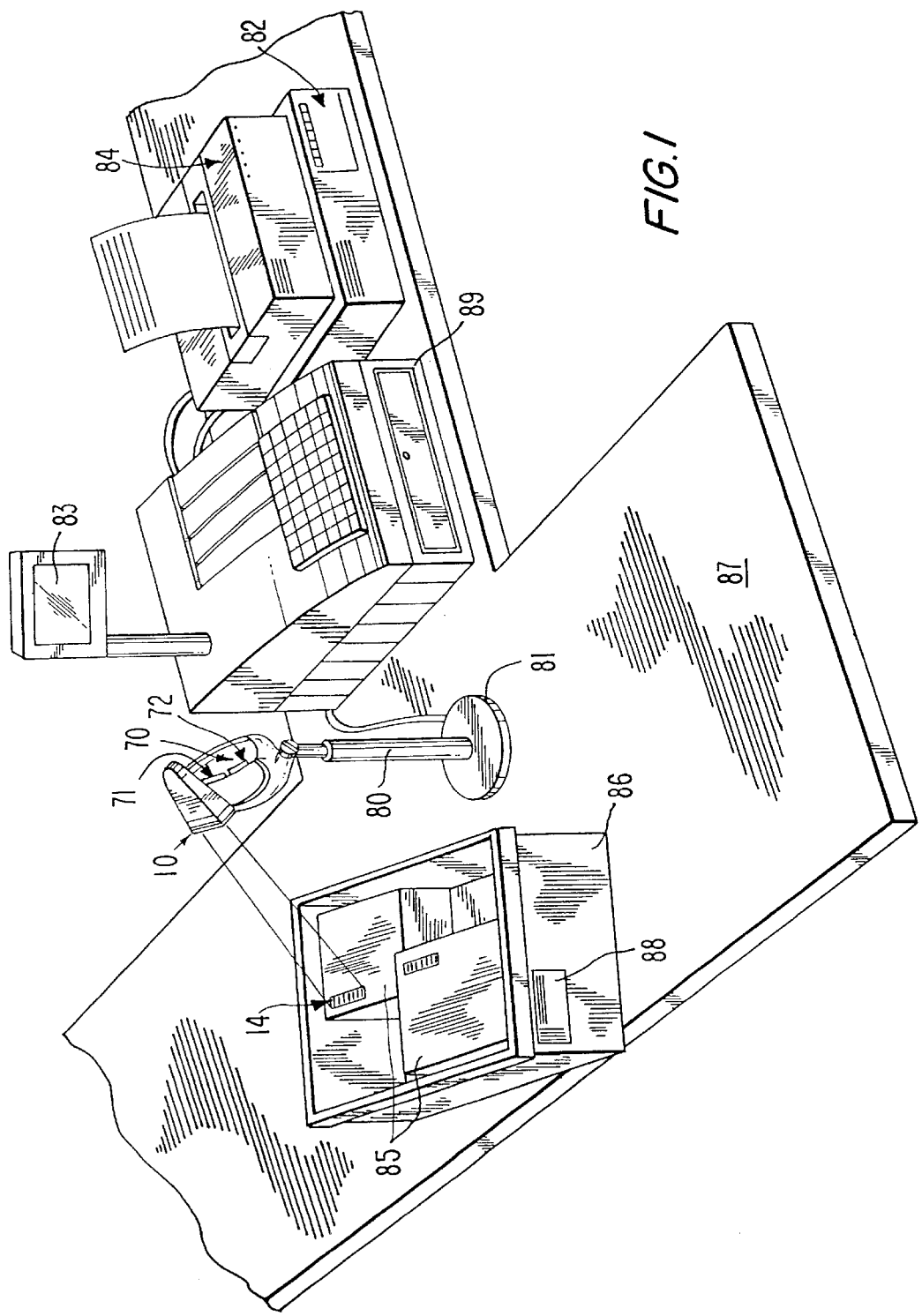
FIG. 1 is a view of a bar code reader system with dual trigger switches in a point-of-sale application environment according to the present invention.

In the point-of-sale system depicted in FIG. 1, merchandise or articles 85 having a one-dimensional bar code symbol 14 are arranged on a counter 87 on which the bar code reader 10 is mounted. The articles 85 are shown placed in a shopping tote 86 which includes an RF identification (ID) tag 88. In one application, the bar code symbols may identify the merchandise, while the RF ID tag 88 may identify the shopper or customer. In another application, the tote 86 may be a shipping container, and the RF ID tag denotes the destination, routing, or shipping address. An RF ID tag detector 69 (shown in FIG. 3) may be included as part of the system. The system may employ both methods of identification, as will be subsequently described.

FIG. 1 shows a bar code reader 10 capable of both stationary and hand-held operation with dual triggers according to the present invention. The reader housing is depicted in the shape similar to the gun-shaped housings known in the prior art. The reader 10 may be picked up by the user for portable use, or mounted in a stand 80 in which the reader can function operating in a fixed mode. In the fixed mode, it is positioned to read the bar code symbol 14 on a target within the field of view of the reader, such as a region of the counter 87. The reader 10 may make electrical contacts to the stand 80, which in turn may be connected to a cash register 89 and/or host computer 82 which may include elements such as a display 83 and a printer 84. In the present invention, the handle position 72 of the housing 10 (i.e., the portion of the housing which is gripped by the user's hand in normal use) includes two discrete trigger switches 70 and 71. The upper switch 70, designed to be activated by the index finger, controls one function or operation, while the lower switch 71, designed to be activated by different fingers, controls a different operation, as will be described below. The switches 70, 71 are independently operable and, hence, either one can be operated before, after, or simultaneously with, the other.

Alternatively, in another embodiment, a single two-position trigger switch may be used in place of dual trigger switches. Examples of functions that may be performed by activation of the first and second positions of a dual or two-position trigger switches are as follows:

1) Position One—aim; Position Two—scan.
2) Position One—scan; Position Two—EAS deactivate.
3) Position One—scan; Position Two—RF ID.
4) Position One—scan; Position Two—transfer data or operate peripheral (e.g., printer, communication and display)

Examples of functions that may be performed with a single trigger with three trigger positions are as follows:

1) Position One—aim; Position Two—scan; Position Three—EAS deactivate.
2) Position One—aim; Position Two—scan; Position Three—RF ID.

3) Position One—scan; Position Two—RFID; Position Three—EAS deactivate.

As used above, the term "EAS deactivate" refers to an operation of deactivating an EAS tag on the article. Reference may be made to U.S. Pat. No. 5,005,125 to describe EAS systems and tags, and their method of deactivation, and to European Patent No. 0355355. The term "RF ID" refers to reading an RF ID tag, such as described in U.S. Pat. No. 4,739,328.

In another embodiment, a single switch may be used to activate one or more different functions. For example, the manual depression of a single momentary action switch from a first to a second position is used to activate a function. This switch need not, and typically is not, held in the second position to execute the function. The manual release of the switch does not perform any function.

In still another embodiment, the manual depression of a single switch from a first to a second position is used to activate a first function, e.g., aiming. Thereupon, the manual release of the switch is used to activate a second function, e.g., scanning.

The sequence and operations described above are merely illustrative, and a particular point-of-sale check-out, shipping, a distribution system or other application may use other sequences or combinations rather than the ones described above.

Figure 2C:
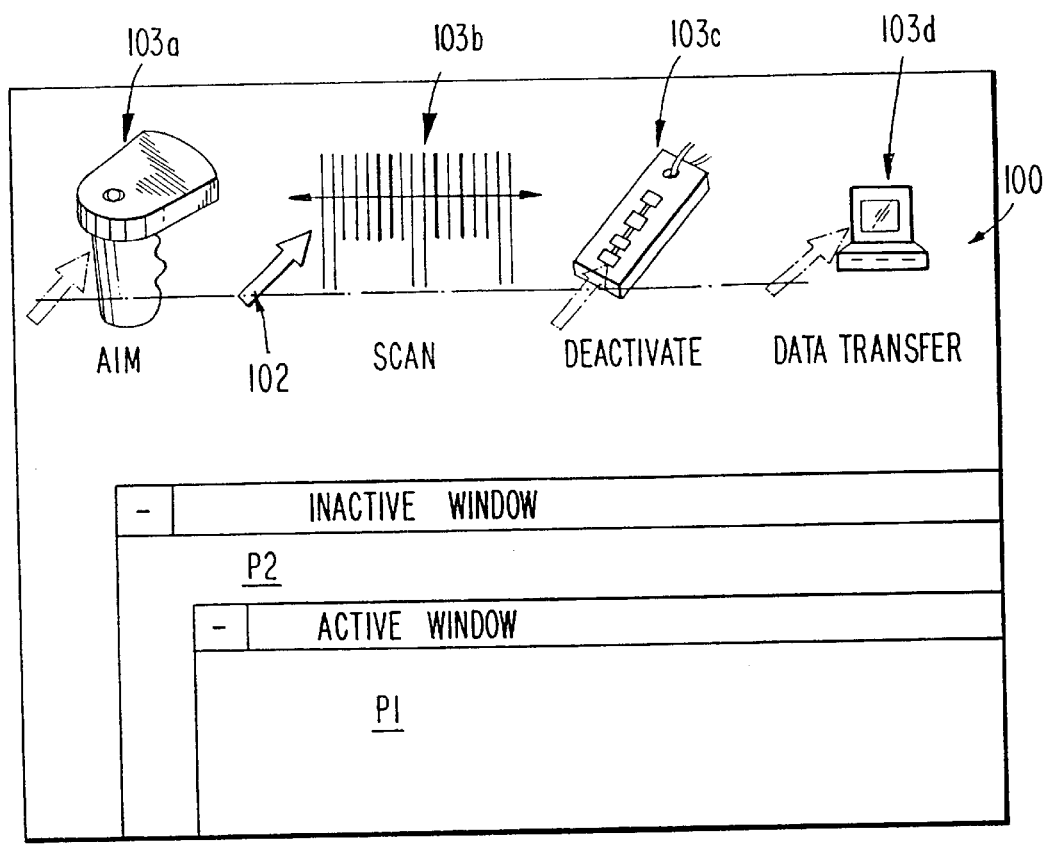

FIG. 2a illustrates the top plan view and FIG. 2b a perspective view of the reader 10 now shown as incorporating a display 100 and a trackball, also known as a joystick 101. The joystick may be moved by the user's thumb to move an arrow-shaped pointer 102 or indicating cursor on the display screen 100. As best shown in FIG. 2c, the display 100 may display icons 103 which in a particular programming environment or graphical user interface may be used to refer to specific program applications, documents, or data records that may be accessed by the system. Thus, FIG. 2c shows an "AIM" icon 103a, a "SCAN" icon 103b, a "DEACTIVATE" icon 103c, and a "DATA TRANSFER" icon 103d. When the pointer 102 is moved among the phantom line positions shown in FIG. 2c, and is aligned with the desired icon, the user can select the application or document represented by the icon by activating a switch by pressing the joystick 101 to cause it to "click" and thereby register to the system the selected icon as representing the particular application, document, or data record desired to be accessed, executed or displayed. Thus, aiming, scanning, tag deactivating and data transferring are executed in response to selecting icons 130a-d, respectively. As examples of the type of documents which may be displayed, two "windows" representing distinct programs P1 and P2 are displayed with the "active" or overlapping one 105 displaying data 106.

FIGS. 2a and 2b also illustrate a solar cell collector 107 which functions to power the reader and/or charge a battery contained within the reader housing 10. In applications in which the stand 80 may be utilized in a location remote from the host computer 82 or other power source, it is advantageous to provide separate means for powering the reader. A solar power battery charger coupled to the solar cell collector 107 achieves this objective in one embodiment of the present invention.

As alternatives to the use of solar cells, microwave or heat energy sources could also be used. In the first variant, a microwave transmitter is installed in the close vicinity of the device (e.g., in the cash register around which a cordless scanner is used). This could be either the transmitter utilized to communicate with the portable device or one which is specific to this task. For both cases, its frequency could be either the same as the one utilized for the communication channel or a different one. Because of regulatory and safety/health issues, in most practical situations only low power levels should be generated.

Alternatively, heat generated in the device could be used, derived from the inherent inefficiency of its components. For example if $\Omega_1$ is the device inefficiency (which results in heat generation), and $\Omega_2$ is the process efficiency of converting heat to electricity, then a fraction of $\Omega_1 \times \Omega_2$ of the battery energy can be used for its charging.

Thus, another feature of the present invention is to provide a system for electro-optically reading indicia having parts of different light reflectivity, a scanning head with a housing; a DC voltage-powered light source mounted in the housing for generating a light beam that may be directed toward an indicium for reflection therefrom; a sensor for detecting light of variable intensity reflected off the indicia and for generating a signal indicative of the indicia; a battery in the housing for supplying DC voltage to the light source; and a solar cell powered charger for charging the battery in the housing.

In one embodiment of the invention, a primary battery is placed in the device: Primary (non-rechargeable) batteries generally have energy density larger than that of secondary batteries (e.g., ≅100 Wh/kg for an alkaline cell vs. ≅30 Wh/kg for a standard Ni—Cd cell). However, this large capacity is substantially reduced at large discharge rates. Devices that operate in short "bursts" during the session (e.g., bar code scanners), do create a high rate of drain on the battery. In the preferred embodiment, the primary battery provides a substantially small charge current to the second battery. The secondary (rechargeable) battery is the power source which directly powers the device, and is continuously recharged at a low level ("trickle charge") throughout the session, while maintaining the cordless mode of operation. The secondary battery can be used to deliver the same overall apparent capacity to the user. In this particular case, at the end of the session the primary battery is replaced and the secondary battery is recharged. However, the overall combination provides for a session which is longer than if a single battery type were used (assuming the same total battery weight).

The following is an illustrative example (specific values used are approximate only). Assume that a device is powered by a 3.6V battery (a series combination of three 1.2V cells) and a maximum of 100 g is allocated for the battery. If only a primary cell is used, then its density is 40 Wh/kg (because of the assumed high drain rate). This will translate to a capacity of (40 Wh/kg×(0.1 kg)/(3.6V)=1.11 Ah. Similarly, if a secondary battery is used, the resulting capacity is (30 Wh/kg)×(0.1 kg)/(3.6V)=0.83 Ah. If a combination of 50 g primary and 50 g secondary are used, (where the primary battery is used to trickle charge the secondary one, and thus its higher density is achieved), then the total capacity for this case is (100 Wh/kg)×(0.05 kg)/(3.6V)+(30 Wh/kg)×(0.05 kg)/(3.6V)=1.39 Ah+0.42 Ah=1.81 Ah, which is a substantial increase over the previous alternatives.

The following is another illustrative example. Assume a device which normally operates at 3V with a 500 mAh battery in 8-hour shifts ("sessions"). Using the concept of this invention, the device is redesigned to operate with a 250 mAh battery. The additional 250 mAh capacity is to be supplied via the trickle charge. The required charging current is thus (250 mAh)/(8 hours)=30 mA. At 3V operation, this corresponds to 90 mW. Assuming 10% power conversion efficiency of solar cells, about 900 mW of ambient light is required to impinge upon the solar cell area. In full sunlight, the intensity is approximately 100 mW/cm$^2$, and in this case a total solar cell area of 9 cm$^2$ will be required. Indoor operation with normal lighting conditions will require substantially larger areas.

Figure 3:
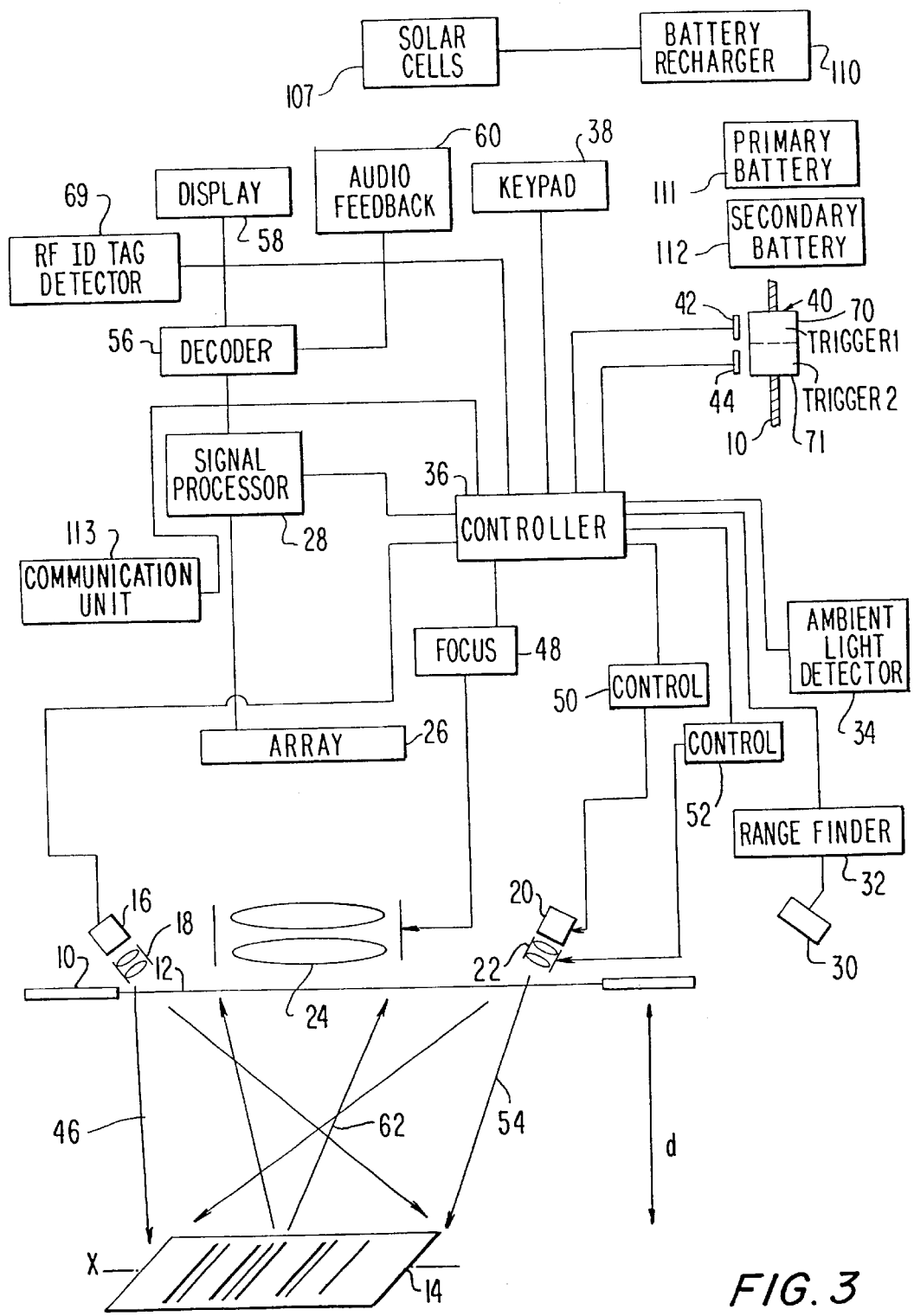
FIG. 3 is a schematic block diagram of the preferred embodiment of the internal optical and electronic elements of the present invention.

Turning to FIG. 3, the housing 10 has a window 12 therein, which is arranged to be positioned by the user opposite a bar code symbol or other indicia 14 to be read. Behind the window 12 is an illumination source, such as a laser 16, with optics 18, an illuminating LED or laser 20, with optics 22, and collection optics 24. Behind the collection optics 24 is a detector or a two-dimensional imaging array 26 such as a CCD array which is arranged to be read out by signal processing circuitry 28. Instead of being a CCD array, the array 26 could comprise any two-dimensional solid-state imaging device; it could, for example, comprise a random-access device. Also provided is a detector 30 coupled to range finder circuitry 32, the purpose of which is to automatically determine the distance d between the window 12 and the indicia 14 which is to be read. The range finder may operate by any desired means, such as by ultrasound or optically. There is also an ambient illumination detector 34 which senses the ambient illumination conditions. The solar cells 107, battery recharger 110, primary battery 111, and secondary battery 112 are also depicted.

Operation of the device is overseen by a common microprocessor or controller 36, operated by means of a keypad 38 and a trigger mechanism 40. The trigger mechanism incorporates dual trigger switches 70, 71, such as shown in FIG. 1, having first switch contact 42 and second switch contact 44.

In use, the operator first pulls the first trigger 70 back to a first position, in which it meets the contact 42. This causes the controller 36 to actuate the laser 16 to produce a visible aiming beam 46 which the operator then manually aligns with the indicia 14. The aiming beam preferably produces a static pattern, or designation pattern, preferably a point or a line which is easily visible. Ideally, the optical system 18 incorporates a cylindrical lens, such as that previously described in copending U.S. patent application Ser. No. 08/268,913 noted above in the Reference to Related Applications, to produce a solid line of light which can quite easily be aligned with the longitudinal axis of the bar code symbol.

Once the operator has properly aligned the reader, the operator then pulls the second trigger 71 which closes the contact 44. This causes the controller 36 to instruct the range finder 32 to determine the distance d. On the basis of that determination, and on the basis of information provided by the ambient illumination detector 34, the controller 36 determines the optimal focusing, magnification and illumination parameters that will be required to decode the image. The controller then sends signals to a focus and magnification control mechanism 48, which adjusts the imaging optics 24, to an illumination control 50, which adjusts the illumination provided by the laser 20, and to a further control 52 for adjusting the optics 22, thereby adjusting the area and/or intensity of the illuminating beam 54 which will subsequently be produced.

Once all the parameters have been determined, and the necessary adjustments made, the controller 36 switches off the laser 16 and switches on the LED or laser 20 for a predetermined period, thereby illuminating the indicia 14 with the beam 54. If the adjustments have correctly been made, the beam will be an optimized match with the size of the code at the measured distance d. An estimate of the apparent size of the code, as seen from the window, can be determined from the known actual size of the code (where available), which may have been entered in advance by means of the keyboard 38.

The indicia 14 is imaged onto the two-dimensional semiconductor array 26, which is then read out by the signal processing circuitry 28. The signals are then decoded by a decoder 56. Feedback is provided to the operator by means of a display 58 and/or audio feedback means 60.

Once the image has been satisfactorily captured, processed and decoded, the controller may automatically instruct the reader to switch itself off, or alternatively to move into a low-power quiescent mode.

In a first variation of the preferred embodiment shown in FIG. 3, the rangefinder 32 and the detector 30 may be omitted. Instead, determination of the distance d may be achieved by analyzing the reflected light 62 which is returned from the symbol as it is being illuminated by the target beam 46. For example, the beam 46 may be pulsed, and temporal measurements may be taken to determine the distance. Alternatively, the beam 46 may be scanned across the indicia, in which case the spectral characteristics of the received signal may provide some indication of the distance. Yet a further alternative is to calculate phase relationships within the reflected light.

A further variation is to replace the lasers 16,20 with a single laser, and the optics 18,22 with a single set of optics. In such an arrangement, the same laser operates to produce the aiming beam (designating pattern) 46 and the imaging illuminating beam 54. Such an arrangement is, of course, only of assistance where the laser produces light of a wavelength which can easily be seen by the operator.

Instead of the trigger 40 being a dual trigger, or two-position trigger, it could be a multi-position trigger. The various trigger positions could undertake a variety of functions; for example, one trigger position might produce a first static pattern (designation pattern), with a second position producing a second pattern, and a third position producing the measurement illumination. This type of arrangement could be useful where the device is to be used in a variety of situations, or with a variety of different bar code symbols, since it would then be possible for the operator to choose an appropriate designation pattern for the indicia which is to be measured. Other trigger positions of a multi-position trigger could provide an on/off function, or other functions for controlling the information shown on the display 58, such as deactivation of an EAS tag, reading of an RF ID tag, or activation of a peripheral device, such as a modem, radio, infrared transmission unit or other communications device, or a peripheral device such as a printer. One example would be initiating wireless communication of the data represented by the symbol through a communication unit 113 connected to the controller 36. Different trigger positions could also be provided to alter the measurement characteristics of the device, for example to provide at least a certain level of manual control over the focusing and/or magnification, such as zooming or spot size adjustment. All of these features will, of course, be controlled by the controller 36.

Instead of, or in addition to, the trigger 40, the aforementioned graphical user interface depicted in FIGS. 2a, 2b and 2c, is useful in performing system functions. Thus, as described above, the user's thumb is used to move the joystick 101 and position the pointer 102 on a selected icon, thereby "highlighting or selecting" the function associated with that icon. Thereupon, either the thumb, is used again to depress the joystick, or one of the user's other fingers is used to depress one of the trigger switches 71 or 72, thereby "choosing or executing" the selected function.

While the preferred form of the optical reader, already described, is a portable, hand-held device, various other options are possible. The embodiment shown in FIG. 3 could, instead, represent a fixed embodiment which is arranged to be built into a point-of-sale unit, for example above a conveyor. The automatic magnification/focus controls enable the device to deal with a variety of different sized packages, passing along the conveyor, thereby presenting bar code symbols at a variety of different distances from the device.

Figure 4:
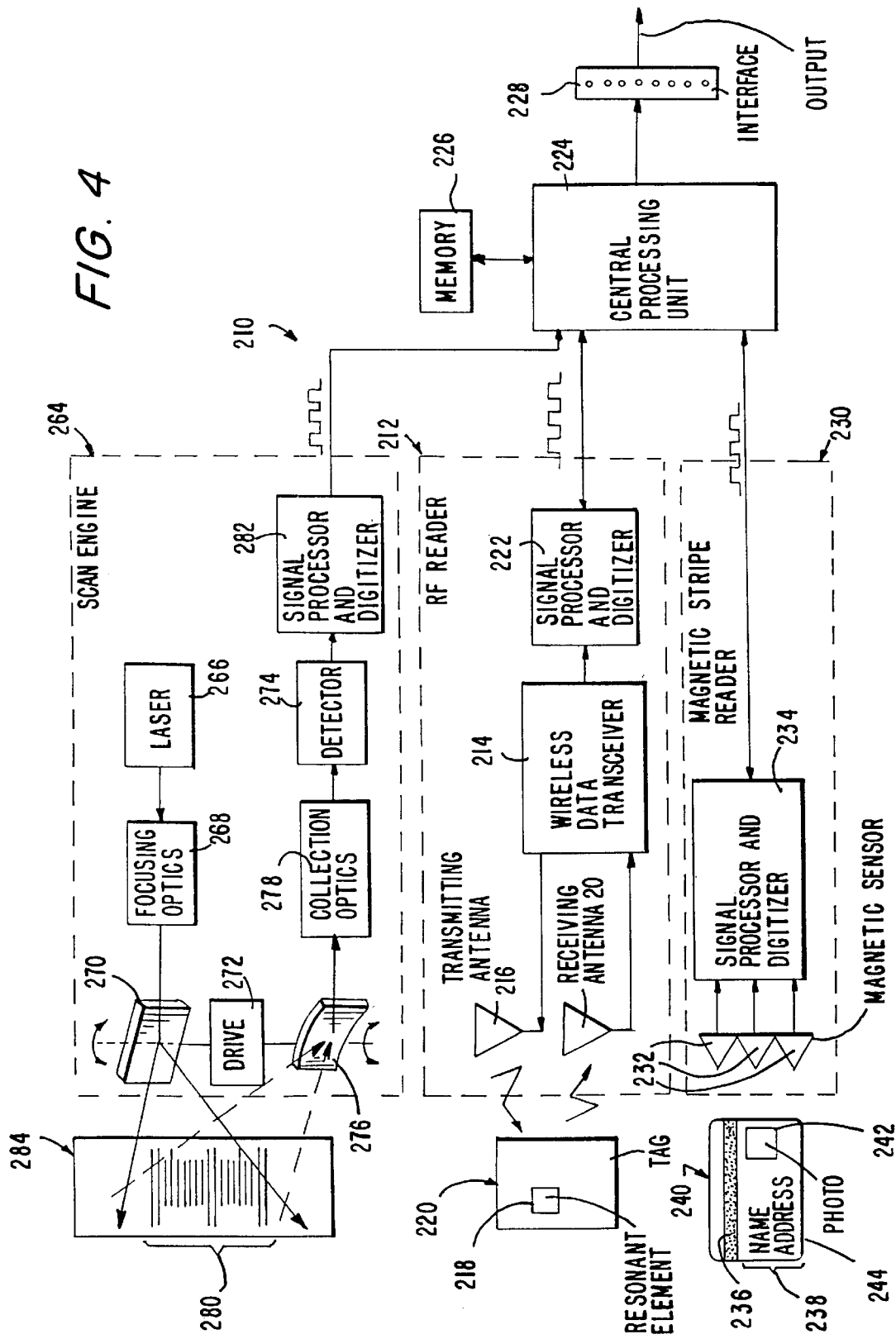
FIG. 4 is a block diagram of an RF reader circuit and a magnetic stripe reader circuit together with a bar code symbol reader circuit in accordance with this invention.

Referring now to FIG. 4, reference numeral 210 generally identifies a block diagram of a module according to this invention. Module 210 includes an RF reader circuit 212 having a wireless data transceiver 214 for emitting RF energy via a transmitting antenna 216 to interrogate or poll at least one resonant element or resonator 218 associated with a target 220.

The resonator 218 may be a quartz crystal or preferably a dipole. The dipole may be a metal-coated fiber resonant at a frequency dependent on the fiber length. The dipole may be embedded in, or affixed to, any target. Preferably, the dipole is carried on a tag or label that is attached, usually by an adhesive, to an object.

The interrogated dipole emits an RF response characteristic which is detected by a receiving antenna 220. The received RF signal is conducted to the wireless transceiver 214 and thereupon is processed in a signal processor 222 which comprises an amplifier, a bandpass filter, a multiplier for sampling the received signal at a rate controlled by a counter to produce a sampled signal, a peak detector for determining the magnitude and duration of the peaks in the sampled signal, an automatic gain controller, and a digitizer for converting the analog sampled signal to a digital signal. The digital signal is then conducted to a central processor unit (CPU) 224 for processing in accordance with a stored algorithm. A memory 226 is connected to the CPU for data storage and retrieval. An output signal from the CPU is conducted therefrom through an interface, typically a single eight-pin connector 228.

Reference numeral 230 generally identifies a magnetic stripe reader circuit having at least one sensor 232, and preferably a plurality of sensors, connected to a signal processor and digitizer circuit 234. A card 240 such as a credit, debit or identification card of generally rectangular form includes an elongated magnetic stripe 236 that has information encoded therein.

The card 240 may have user identification thereon in human-readable form such as name and address data 238, or a photograph 242 of the card's owner, or other information relating to the user, such as insurer data (in the case of a medical or patient card), motor vehicle data (in the case of a vehicle license and registration card), financial institution data (in the case of bank, credit or debit cards), etc. The card 240 may have any or all of the above data in machine-readable form such as bar code symbols in either one-or two-dimensional format.

The card 240 may have an integrated chip embedded therein as in the case of "smart" cards, or may even have the resonant elements discussed above in connection with RF readers supported by the cards. In each case, the card has a longitudinal edge 244 extending in a longitudinal direction generally parallel to the longitudinal direction along which the stripe 236 extends. This edge 244 serves as a guide and insures that the stripe 236 is correctly positioned relative to the sensor 232 as the card is slid past the sensor as is common with magnetic stripe technology.

The sensor 232 detects the data encoded in the stripe and generates an electrical data signal which is then processed and digitized to obtain a digital signal which is conducted to the CPU 224 for processing in accordance with a stored algorithm. The output signal from the CPU is fed to the output interface 228.

Figure 5:
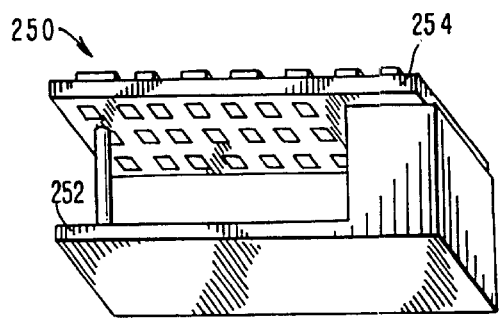
FIG. 5 is a perspective view, from the front and below, of a module for supporting the circuits of FIG. 4.

As described so far, the RF reader circuit 212 and the magnetic stripe reader circuit 230 share the common CPU 224 and, in some cases, can share some of the signal processing and digitizer components in the signal processors 222 and 234. As shown in FIG. 5, reference numeral 250 generally identifies a common support such as the aforementioned SE 1200 laser scan engine module on which the RF reader and magnetic stripe reader circuits 212, 230 are supported. The support 250 includes a generally planar base 252 and a printed circuit board 254 mounted in a plane generally parallel to and elevated relative to the base 252. The support 250 also includes a standard laser scan engine circuit 264 depicted in FIG. 4, and including a laser diode 266 for emitting a laser beam, lenses 268 for focusing the laser beam, a scan mirror 270 for reflecting the beam outwardly of the module, a drive 272 for moving the scan mirror and sweeping the beam across a bar code symbol 280 for reflection therefrom, a photodiode 274 for detecting the reflected light, and a collection mirror 276 and collection optics 278 for collecting the reflected light and directing it to the photodiode, as well as signal processor and digitizer circuitry 282 for processing and digitizing a detected signal generated by the photodiode. Circuit components 234, 222 and 282 could be a single signal processor and digitizer circuit with switched inputs for different signal sources.

The symbol 280 is machine-readable and is one-or two-dimensional. The symbol 280 is associated with a target or object 284 and identifies the object.

Figure 6:
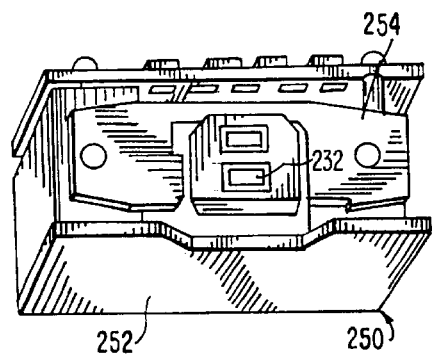
FIG. 6 is a perspective view, from the rear and below, of the module of FIG. 5.

FIG. 6 depicts an opposite side view of the support of FIG. 5, in which the magnetic stripe sensor 232 is depicted. The sensor 232 is recessed into the support so that the maximum form factor dimensions of the SE 1200 will not be exceeded. The RF reader circuit 212 is mounted on the printed circuit board 254, or may be mounted on another printed circuit board mounted on the module.

Figure 7:
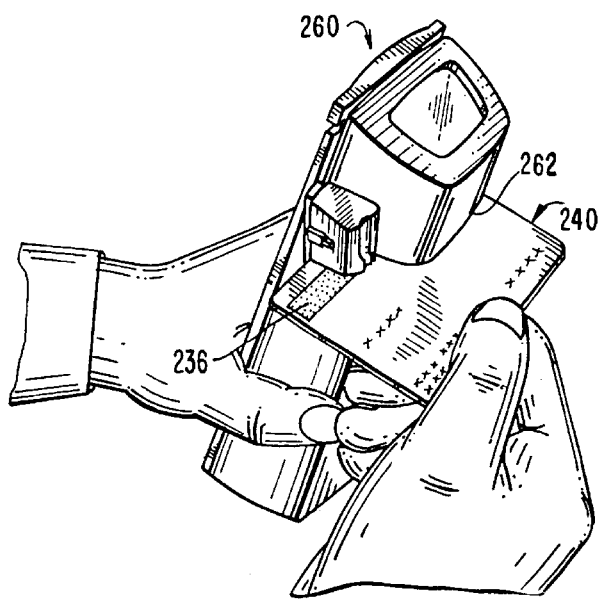
FIG. 7 is a perspective view of a data collection terminal having the module of FIGS. 5–6 therein during a card reading procedure.

FIG. 7 depicts a hand-held data collection terminal 260 in which the module of FIGS. 5 and 6 is mounted during swiping of the card 240 past the sensor 232. A card reading slot 262 is formed in the terminal.

It will be understood that each of the elements described above, or any two or more together, also may find a useful application in other types of constructions differing from the types described above.

Figure 8:
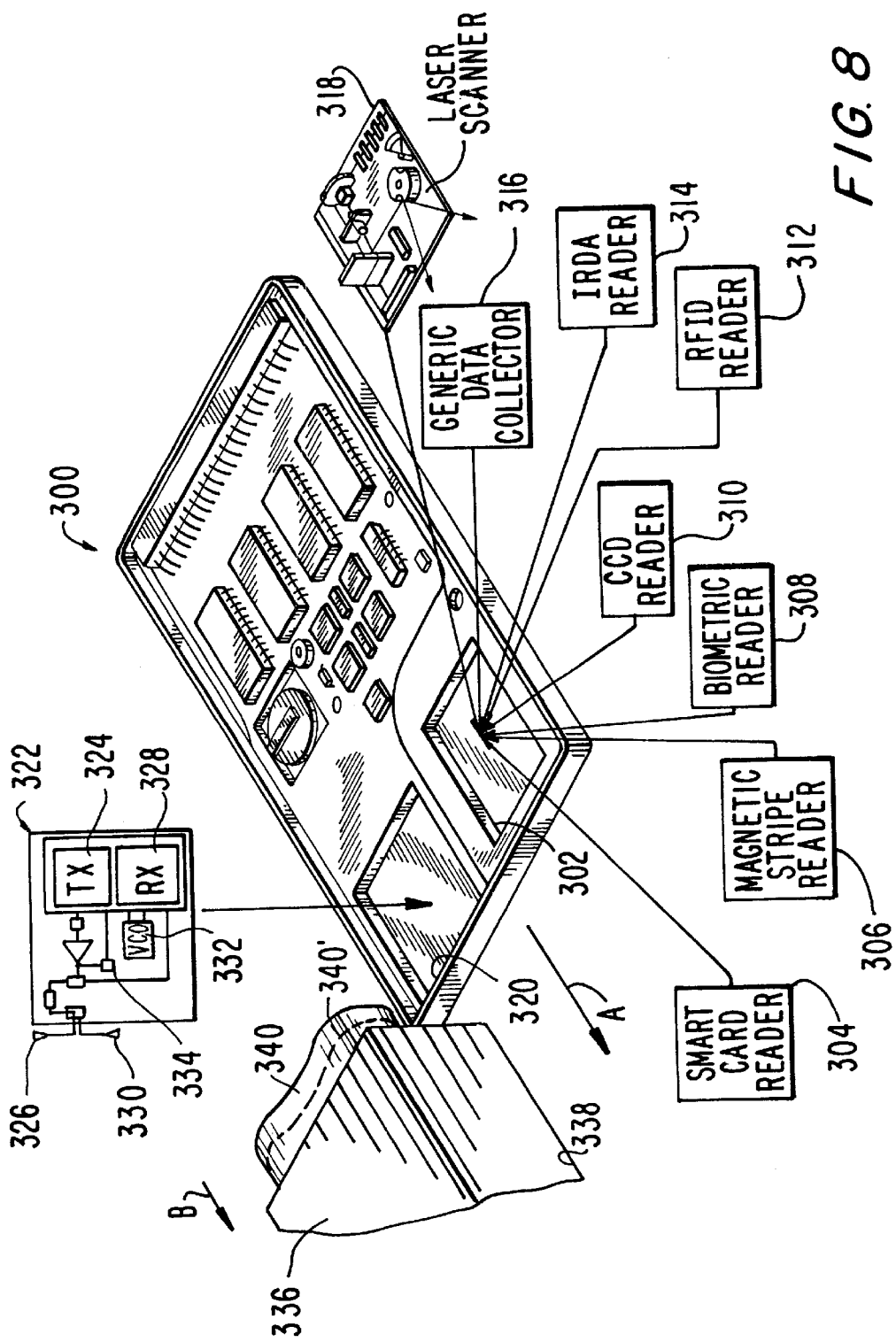
FIG. 8 is a part perspective, part schematic, diagrammatic view of a card slidable in a slot of a housing, the card having a plurality of data collectors and a transceiver.

Thus, as shown in FIG. 8, the system components need not be mounted on a generally rectangular parallelepiped module as in FIGS. 5–6, but can be mounted on a plug-in card 300 of the type generally known as a PCMCIA card that is insertable in the direction of arrow A into a slot 338 commonly found in a laptop computer 336.

The card or support 300 has a first mounting region 302 at which any data collector and, preferably, a plurality of data collectors is mounted. By way of example, the data collector can be a smart card reader 304 for reading a smart card chip, a magnetic stripe reader 306 of the type 230 described above, a biometric reader 308 for reading a physical characteristic of a user such as a fingerprint, a retina, or a voice, a CCD reader 310 of the type described above, an RF ID reader 312 of the type 212 described above, an IRDA reader 314 for detecting infrared data, a laser scanner 318 of the type 264 described above, or any generic data collector 316 for collecting data for subsequent use.

The card 300, just like the module 250, can be mounted in any housing, for example, the hand-held housing 10 of FIG. 1 which, it will be recalled, has a pair of triggers 71, 72. One trigger can be used to actuate any one of the aforementioned data collectors, and the other trigger can be used to actuate any other one of the aforementioned data collectors. By way of example, activation of trigger 71 may serve to actuate the laser scanner 318 for reading the symbol 14, and activation of trigger 72 may serve to actuate the RF ID reader 312 for reading the RF ID tag 88.

As before, the triggering of the plurality of data collectors need not be accomplished by depressing two separate triggers, but can be achieved by depressing a single trigger 340 having two or more positions such as position 340' in the direction of arrow B in FIG. 8, or by manipulating a pointer device on a graphical user interface.

The card 300 may also have a second mounting region 320 spaced from the first mounting region 302. A wireless transceiver 322 is mounted at the second mounting region 320, and includes a transmitter 324, a transmitting antenna 326, a receiver 328, a receiving antenna 330, a voltage controlled oscillator 332 and a crystal oscillator 334. The transceiver preferably operates at a radio frequency of 2.4 GHz and employs the IEEE 802.11b protocol.

The transceiver 322 can be activated by one of the triggering actions described above, for transmitting data to and from a remote host by wireless communication. In an application where two of the data collectors, e.g., 318 and 312, have collected data, then the transceiver can be activated by one of the triggering actions to transmit the data from one of the collectors, and by another triggering action to transmit the data from the other of the collectors.

The data transmitted need not be data that was previously collected by one of the collectors, but can be data entered, for example, by a keyboard or data stored by a manufacturer. In one embodiment, data relating to opening a door, such as a garage door, can be input by the manufacturer or by the user, and thereupon, one of the triggering actions can cause the door to be opened, and another of the triggering actions can cause a garage or home lighting system to be activated.

While the invention has been illustrated and described as embodied in a triggered data collector and data transmitter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should be and are intended to be comprehended within the meaning and range of equivalents of the following claims.

What is claimed as new and desired to be protected by Letters Patent is set forth in the appended claims.

We claim:

1. An arrangement for processing information, comprising:
    a) a support;
    b) a first, actuatable data collector on the support, for collecting first data;
    c) a second, actuatable data collector on the support, for collecting second data; and
    d) a triggering circuit for independently, manually actuating the first and second data collectors to independently collect the first and second data, respectively.

2. The arrangement of claim 1, wherein the support is a generally planar card.

3. The arrangement of claim 2, wherein the card is a PCMCIA card.

4. The arrangement of claim 1, wherein each data collector is one selected from a group comprised of a bar code symbol reader, a radio frequency identifying tag reader, a smart card reader, a magnetic stripe reader, a biometric reader, a charge coupled device reader and an infrared data reader.

5. The arrangement of claim 1, wherein the triggering circuit includes a pair of independently operable trigger switches.

6. The arrangement of claim 1, wherein the triggering circuit includes a single trigger switch having a plurality of trigger positions, each operative for actuating the respective data collectors.

7. The arrangement of claim 1; and further comprising a wireless transceiver on the support, for transmitting at least one of the data by wireless communication to a host remote from the support.

8. An arrangement for processing information, comprising:
    a) a support;
    b) an actuatable data collector on the support, for collecting data;
    c) an actuatable transceiver on the support, for transmitting the data by wireless communication to a host remote from the support; and
    d) a triggering circuit for independently, manually actuating the data collector and the transceiver.

9. The arrangement of claim 8, wherein the triggering circuit includes a pair of independently operable trigger switches.

10. The arrangement of claim 8, wherein the triggering circuit includes a single trigger switch having a plurality of trigger positions, each operative for actuating the data collector and the transceiver, respectively.

11. An arrangement for processing information, comprising:
    a) a support;
    b) a plurality of data collectors on the support, for collecting a plurality of data;
    c) an actuatable transceiver on the support, for transmitting the plurality of data by wireless communication to a host remote from the support; and
    d) a triggering circuit for independently, manually actuating the transceiver to transmit one of the data during a first actuation of the triggering circuit, and to transmit another of the data during a second actuation of the triggering circuit.

12. The arrangement of claim 11, wherein the triggering circuit includes a pair of independently operable trigger switches.

13. The arrangement of claim 11, wherein the triggering circuit includes a single trigger switch having a plurality of trigger positions, each operative for actuating the triggering circuit.

14. A method of processing information, comprising the steps of:
   a) collecting first data by operating a first, actuatable data collector;
   b) collecting second data by operating a second, actuatable data collector; and
   c) independently actuating the data collectors by manually operating a triggering circuit.

15. The method of claim 14, wherein each collecting step is performed by performing one of the steps of reading a bar code symbol, a radio frequency tag, a smart card, a magnetic stripe, a biometric characteristic of a user, an image, and infrared data.

16. The method of claim 14, wherein the actuating step is performed by independently operating a pair of trigger switches.

17. The method of claim 14, wherein the actuating step is performed by actuating a single trigger switch to a plurality of trigger positions.

18. The method of claim 14; and further comprising transmitting at least one of the data by wireless transmission to a host remote from the collectors.

19. A method of processing information, comprising the steps of:
   a) collecting a plurality of data; and
   b) transmitting the plurality of data by wireless communication to a host by transmitting one of the data during a first actuation of a triggering circuit, and by transmitting another of the data during a second actuation of the triggering circuit.

* * * * *